United States Patent [19]
Koester

[11] 4,068,809
[45] Jan. 17, 1978

[54] FILMSTRIP CARTRIDGE WITH FILM LOCK

[75] Inventor: Richard H. Koester, Rochester, N.Y.

[73] Assignee: The Singer Company, New York, N.Y.

[21] Appl. No.: 724,880

[22] Filed: Sept. 20, 1976

[51] Int. Cl.² .................. G03B 1/04; G11B 15/32; G03B 23/02

[52] U.S. Cl. .................. 242/197; 242/71.1; 352/78 R; 353/120

[58] Field of Search ............. 352/78 R; 353/19, 120, 353/122, DIG. 2; 242/71.1, 197

[56] References Cited
U.S. PATENT DOCUMENTS

| | | | |
|---|---|---|---|
| 1,824,709 | 9/1931 | Debrie | 352/77 |
| 3,342,431 | 9/1967 | Mouissie | 242/197 |
| 3,442,580 | 5/1969 | Winkler | 352/72 |
| 3,529,890 | 9/1970 | Buon | 352/78 R |
| 3,582,014 | 6/1971 | Jorgensen | 352/78 R |
| 3,692,392 | 9/1972 | Brill | 352/78 R |
| 3,734,606 | 5/1973 | Irving | 353/19 |

Primary Examiner—Steven L. Stephan
Attorney, Agent, or Firm—Edward L. Bell; Robert E. Smith; C. R. Lewis

[57] ABSTRACT

A film strip cartridge having a film guide channel thru which film may be advanced has a film lock means disposed in the channel to selectively arrest the advancement of the film. The film lock is formed from a resilient wire which has a first end secured to a portion of the cartridge. A nub is formed in the wire intermediate to the first end and the distal end of the wire. The resilient wire urges the nub into one of the perforations formed along the margin of the film to arrest the longitudinal movement of the film and thereby prevent inadvertent film removal.

2 Claims, 7 Drawing Figures

FILMSTRIP CARTRIDGE WITH FILM LOCK

BACKGROUND OF THE INVENTION

1. Field of the Invention

The present invention relates to a film strip cartridge having a film lock designed to arrest longitudinal movement of the film by causing a lock means to penetrate one of the perforations along the margin of the film.

2. Description of the Prior Art

Conventional strip film cartridges have a guide channel thru which film may be advanced in a first direction for engagement with a complimentary film strip projector or in a second direction for film rewind. During the normal handling of these cartridges, it is possible for the film to be inadvertantly pulled from the cartridge. The film must then be manually coiled and the cartridge reloaded. Film locks have been developed to prevent movement of the film in the cartridge. One such type of film lock is described in U.S. Pat. No. 3,692,392 filed Sept. 19, 1972. The lock described therein utilizes a rigid pin in combination with an endless film cartridge to provide a means to retain the film in proper relationship with the projecting aperture. The pin penetrates one of the margin perforations of the film to prevent longitudinal movement of the film. Such pin locks are generally satisfactory. However, if the locked film is inadvertently pulled with excessive force, the rigid pin can tear thru the portion of the film separating the aperture.

The present invention provides a film lock for penetrating a marginal perforation to lock the film against inadvertent longitudinal movement. In an alternate embodiment, the locked film may be pulled with excessive force to cause the locking means to extract itself from the perforation without causing damage to the film.

SUMMARY OF THE INVENTION

A film strip cartridge has a film guide channel adapted to guide the longitudinal movement of strip film having serial perforations along the margins. A first end of a resilient wire is secured to the cartridge and a nub is formed in the wire intermediate to the first end and the distal end of the wire. The nub is urged into one of the perforations to arrest the longitudinal movement of the film. A species of the nub is configured to extract itself from the perforations when the force applied to the film exceeds a predetermined level.

BRIEF DESCRIPTION OF THE DRAWINGS

The present invention will be fully understood from consideration of the following detailed description of the preferred embodiment taken in conjunction with the accompanying drawings, in which like reference characters refer to like structure in the several views, and wherein.

DETAILED DESCRIPTION OF A PREFERRED EMBODIMENT

Figure 1:
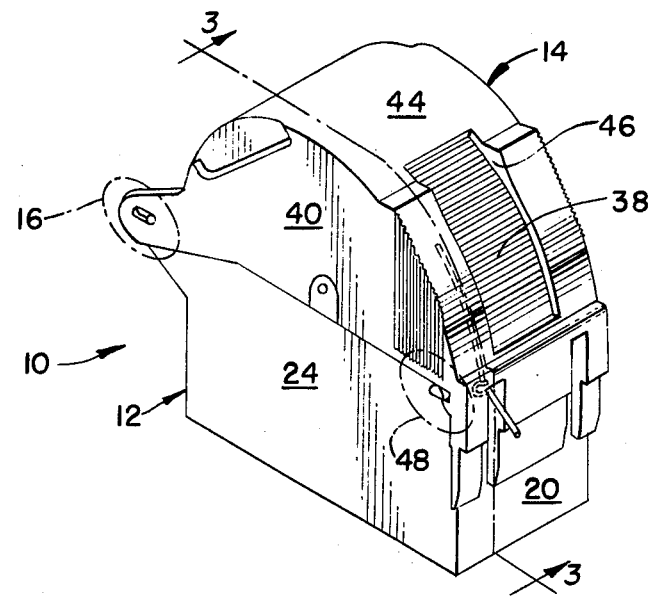
FIG. 1 is a front perspective view of a film strip cartridge utilizing the present invention.
Figure 2:
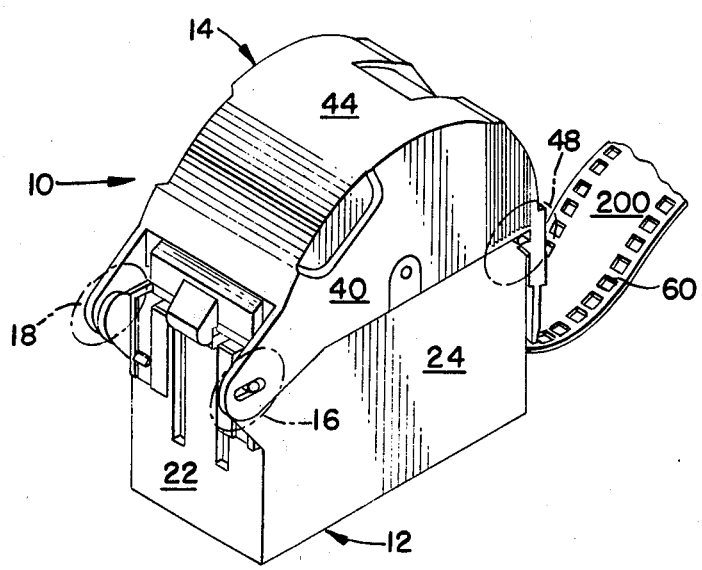
FIG. 2 is a rear perspective view of the film strip cartridge shown in FIG. 1 and shows film issuing from the cartridge.

A film strip cartridge 10 incorporating a preferred embodiment of the present invention is illustrated in perspective view in FIG. 1 and FIG. 2. The cartridge 10 includes a housing 12 hinged to a complimentary hood 14 by conventional hinges shown in the encircled areas 16 and 18.

Figure 3:
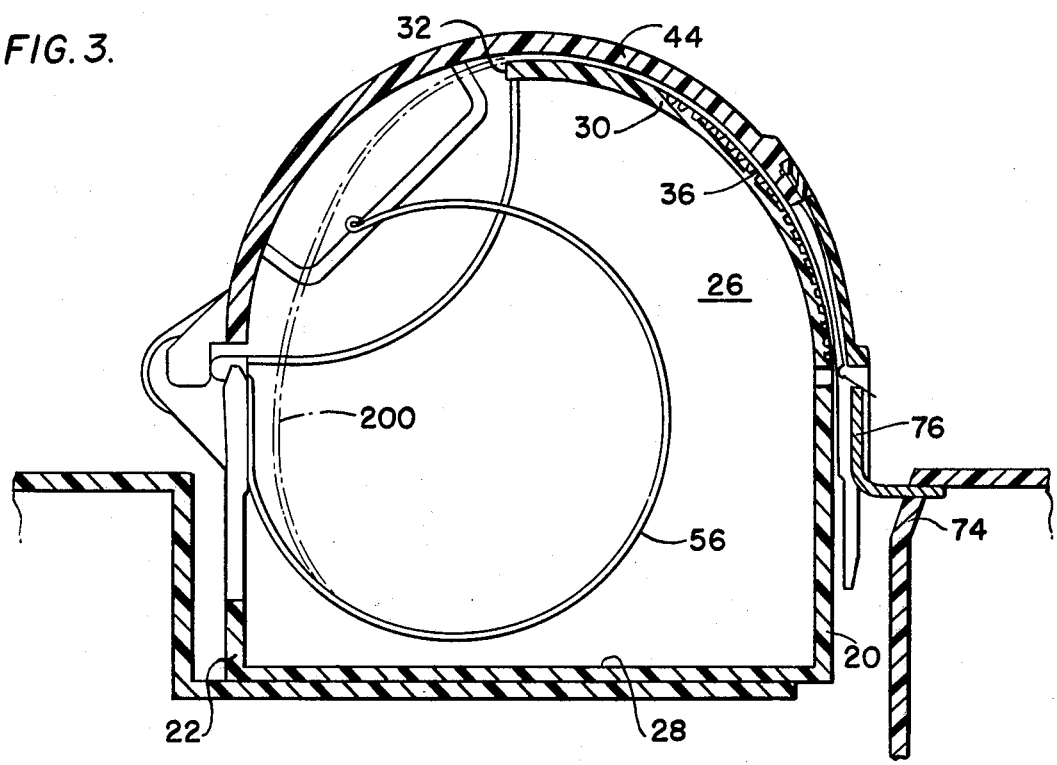
FIG. 3 is a cross section side elevation view of the film strip cartridge shown in FIG. 1 taken along line 3—3.
Figure 6:
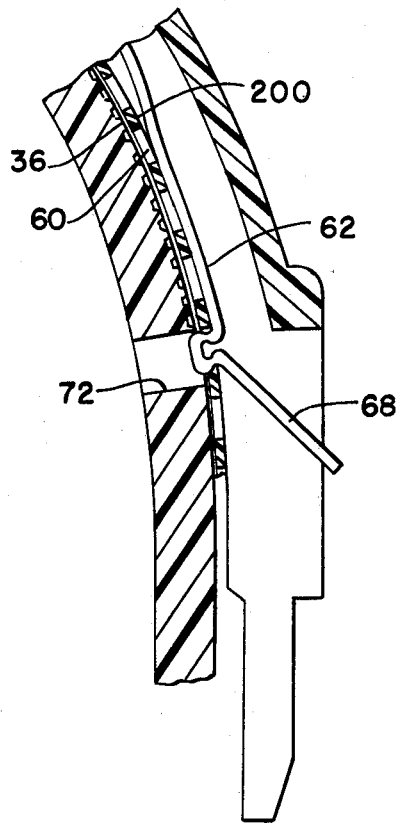
FIG. 6 is a cross section side elevation view of a portion of the film strip cartridge shown in FIG. 5 showing the nub in the locked position.
Figure 4:
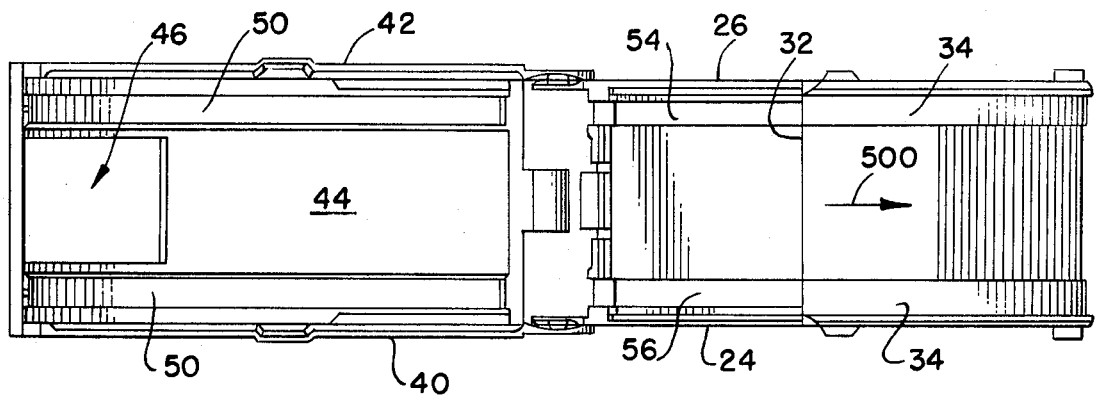
FIG. 4 is a plan view of a open film strip cartridge.

The lower portion of the housing 12 is formed as a parallelpiped with a forward wall 20, a rear wall 22, side walls 24 and 26 (FIG. 3), and a bottom 28 (FIG. 3). A curved wall 30 joins the top portion of the two side walls 24 and 26 to give the upper portion of the housing 12 the curved profile shown in cross section view FIG. 3. The curved wall commences at the forward wall 20 and terminates at an edge 32. With the hood 14 open as shown in FIG. 4, an opening for loading and unloading the film 200 (shown issuing from the cartridge 10 in FIG. 2) is defined between the edge 32 and the rear wall 22. First guide surfaces 34 (shown in plan view in FIG. 4) are provided by the raised exterior lateral portions of the curved wall 30. A side view of the film guide surfaces 34 is not shown in FIG. 3 for reasons of clarity. As explained below, the film 200 is positioned along the guide surfaces 34 and travels along its longitudinal axis as represented by the arrow 500 in FIG. 4. A series of spaced ridges 36 are formed on the exterior side of the curved wall 30 to collectively provide a serrated region 38. The ridges 36, as shown in preferred embodiment of FIG. 4 and FIG. 6, are aligned in a direction transverse to the longitudinal axis of the film 200. The transverse alignment is merely exemplary. The ridges may be formed parallel to or at an angle to the longitudinal axis 500 of the film 200.

The hood 14 has generally coplanar sidewalls 40 and 42 (FIG. 4). A curved wall 44 joins the two sidewalls 40 and 42 to give the hood 14 curved profile shown in FIG. 3. A finger opening 46 is formed in the curved wall 44. The hood 14 is hinged to the housing 12 by the conventional hinges shown in the encircled areas 16 and 18, and fits over the upper portion of the housing 12. The hood 14 is maintained in the closed position by snap closures shown in the encircled area 48. One such snap closure is located on each side of the cartridge 10. Second guide surfaces 50 (shown in plan view in FIG. 4) is provided by the raised interior lateral portions of the curved wall 44. When the cartridge 10 is closed, the second guide surfaces 50 are spaced from the guide surfaces 34 to define a film guide channel 52 (FIG. 5) thru which the film 200 can travel.

When the film 200 is in operating engagement with a film strip projector, the film 200 is caused to be advanced along a longitudinal axis thru the film guide channel 52. Support for the lateral margins of the film is provided by the guide surfaces 34 and by the guide surfaces 50. The median portion of the film 200, which bears the image information, does not normally come into contact with the serrated region 38 during the advancement of the film 200 by the film projector.

However, when the film cartridge 10 is loaded into the projector, it is necessary that the film 200 be manually advanced so that the leading edge of the film 200 moves into engagement with the film 200 advancing means in the projector. In order to manually advance the film 200, the projector operator uses a finger, to push the surface portion of the film 200 accessible thru the finger opening 46. When the film 200 is manually urged along the film guide channel 52, the median portion of the film 200 comes into contact with the serrated region 38. The serrated region 38 reduces the area of contact between the median portion of the film 200 and the cartridge 10, and thereby reduces the friction forces between the film 200 and the serrated region 38 during manual loading. The friction between the projector operator's finger and the film 200 is thereby made reliably larger then the friction between the cartridge 10 and film 200. Thus, the serrated region 38 provides a means to insure reliable and efficient film 200 loading. Also, the spaces between adjacent ridges 36 serves to collect particles of dust and other contamination to minimize the possibility of film 200 scratching.

Two curved leaf springs 54 and 56, which are formed from flat spring steel stock, are provided in the housing 12 to maintain the film 200 in the coiled state. The leaf springs 54 and 56 have a curved profile shown in FIG. 3. One end of each spring 54 and 56 is secured to the rear wall of the housing 12 and the other end extends into the interior of the housing 12. The leaf springs 54 and 56 cradle and guides the film 200 into a coiled (not shown) condition interior of the curve with a radially inward force to maintain the film 200 in the coiled state during winding and unwinding. An exemplary portion of film 200 leading from the springs 54 and 56 to the film guide channel 52 is shown in FIG. 3 (broken line illustration).

Figure 5:
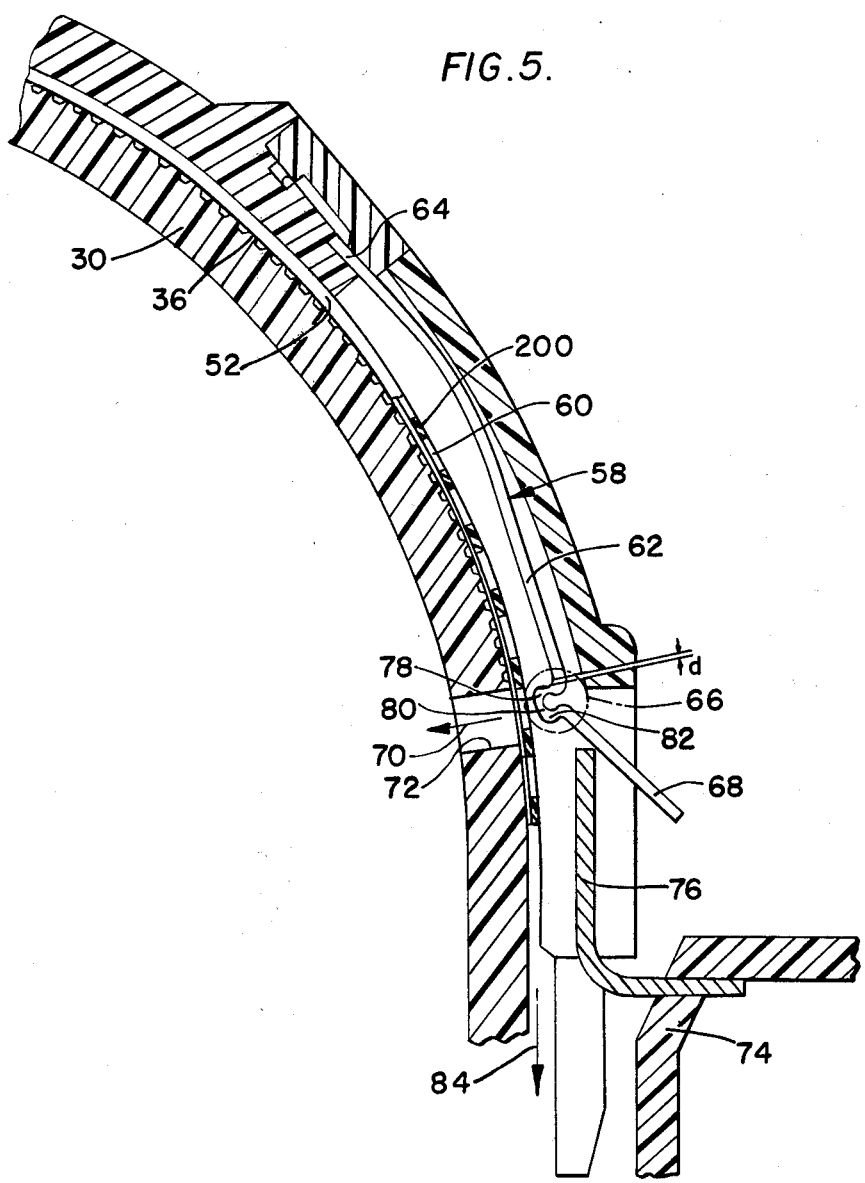
FIG. 5 is a cross section side elevation view of a portion of a film strip cartridge shown in FIG. 2 showing the nub in the extracted position.

As best seen in FIG. 5 and FIG. 6, a film lock generally designated by the reference character 58 is located in the hood 12. An illustrative section of film 200 having serial margin perforations 60 is shown disposed in the film guide channel 52. A spring wire 62 has a first end 64 secured to the hood 12. The end 64 may be secured in any well known manner, such as, implantation in the material from which the cartridge 10 is fabricated, or mechanical crimping of the end 64 to a mounting post. A nub, shown in the encircled area 66, is formed in the wire 62 at a point intermediate the first end 64 and the distal end 68. The dimensions of a nub 66 are preselected to be smaller than the dimensions of the perforations 60. The resiliency of the wire 62 is also preselected to urge the nub 66 in the direction of the arrow 70. As readily appreciated, the nub 66 will enter one of the perforations 60 as shown in FIG. 6 and prevent longitudinal movement of the film 200. A relief bore 72 is formed in the curved wall 30 to accept the nub 66. The distal end 68 of the wire 62 constitutes a convenient means to unlock the film 200 when the cartridge is engaged with a complimentary film projector. As the cartridge 10 is engaged with the projector structure, shown generally by the reference character 74 in FIG. 5, a projecting arm 76 contacts the distal end 68 of the wire 62 and forces it upward to extract the nub 66 from the perforation. The film 200 is thereby unlocked and is free to be threaded into the film projector. Thus, when the cartridge 10 is in operating engagement with a film 200 projector, the film 200 is unlocked, and when the cartridge 10 is removed from operating engagement with the projector, the film 200 is locked to prevent unwanted film 200 movement. When the cartridge 10 is removed from the projector, the film 200 may be readily unlocked by pushing the distal end 68 of the wire 62 upward with a finger.

The nub 66 as configured in FIG. 5 and FIG. 6 includes a first leg 78, a bight portion 80, and a second leg 82. A portion of the first leg 78 where it merges with the wire 62, is under cut by any amount (d). When the film 200 is locked in the film guide channel 52, a pulling force in the direction of the arrow 84 will cause the edge of the perforation 60 to ride into the undercut area (d) to insure that the film 200 does not slip from the nub 66. The undercut distance (d) may be introduced when the resilient wire 62 is formed to shape, or it may be introduced by a material removal operation (e.g. grinding, filing, etc.) after the wire 62 is formed to shape.

Figure 7:
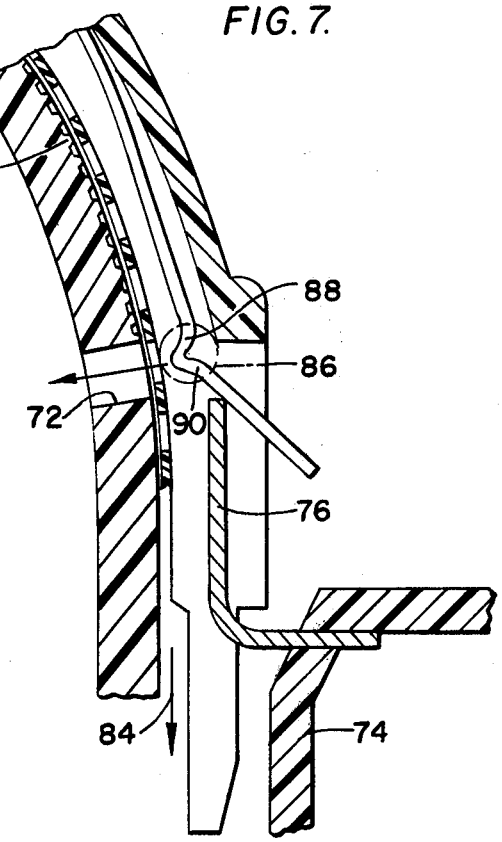
FIG. 7 is a side view of a portion of the film strip cartridge utilizing an alternate embodiment of the nub.

For some applications, e.g. where it is possible that an inexperienced projector operator may pull the film 200 will excessive force, it is desirable that the film 200 strip slip from the nub 66 to prevent tearing the portion of the film 200 between the perforation 60. A second nub configuration, shown in the encircled area 86 of FIG. 7, is designed to unlock film when a pulling force above a predetermined level is applied to the film 200. The nub 86 includes a first leg 88, and a second leg 90. The first leg 88 and the wire 62 are formed at an obtuse angle. When the film 200 is pulled in the direction of the arrow 84 the film will ride along the inclined first leg 88 until the a force level is reached where the nub 86 will be forced out to the perforation 60 to unlock the film 200. Damage from excessive pulling force is thereby prevented.

As will be apparent to those skilled in the art, various changes and modifications may be made to the preferred embodiment of the invention described herein without departing from the scope of the claimed invention.

I claim:
1. A filmstrip cartridge with means to arrest the longitudinal movement of film having marginal perforations along an edge comprising:
    a filmstrip cartridge having a guide channel thru which film may be moved along its longitudinal axis;
    a resilient wire having one end secured to a portion of said cartridge;
    said resilient wire being generally parallel to said longitudinal axis of said film;
    a nub formed in said wire;
    said nub having a first leg and a second leg;
    said second leg and said resilient wire defining an obtuse angle;
    said nub capable of penetrating one of said perforations;
    said nub movable to a first position in which said nub penetrates one of said perforations to arrest the longitudinal movement of said film;
    said wire resiliently biasing said nub to said first position; and
    said nub movable to a second position out of engagement with said perforations;
    whereby a pulling force above a predetermined level applied along said longitudinal axis of said film will cause said nub to be forced out of said perforation.
2. The apparatus claimed in claim 1, wherein
    said nub is formed in said wire intermediate said first end and a distal end; and
    said distal end of said resilient wire extends outward of said cartridge for selective engagement with a complimentary distal end engaging means on a film strip projector to cause said nub to move to said second position.

* * * * *